United States Patent [19]

Friedmar

[11] Patent Number: 4,893,540
[45] Date of Patent: Jan. 16, 1990

[54] DISPLAY APPARATUS FOR VISUALLY IMPAIRED PERSONS

[76] Inventor: Richard M. Friedmar, P.O. Box 2824, Toledo, Ohio 43606

[21] Appl. No.: 135,933

[22] Filed: Dec. 21, 1987

Related U.S. Application Data

[63] Continuation-in-part of Ser. No. 938,153, Dec. 4, 1986, abandoned.

[51] Int. Cl.$^4$ ............................................. G09B 15/08
[52] U.S. Cl. .......................................... 84/478; 353/74
[58] Field of Search ................ 84/470 R, 484, 477 R, 84/478; 353/46, 47, 71, 74, 67; 352/104

[56] References Cited

U.S. PATENT DOCUMENTS

| | | | |
|---|---|---|---|
| 2,483,570 | 10/1949 | Bergey | 84/484 |
| 3,577,824 | 5/1971 | Lavan | 84/470 R X |
| 3,887,275 | 6/1975 | Heist | 353/74 |
| 3,991,648 | 11/1976 | Karpowicz | 84/484 X |
| 4,097,135 | 6/1978 | Castor | 84/470 R X |
| 4,331,062 | 5/1982 | Rogers | 84/470 R X |

Primary Examiner—L. T. Hix
Assistant Examiner—Brian W. Brown
Attorney, Agent, or Firm—Marshall & Melhorn

[57] ABSTRACT

An apparatus and a method for displaying visual information such as music to persons having visual deficiencies includes a housing having a rear projection screen and a mechanism for projecting images of the information. The mechanism can include a slide tray for storing transparencies of the information, a projection lamp and lens, and means for moving the slides from the storage tray to the projection lamp and back again. Controls are provided for varying the brightness of the projection lamp and the speed at which the slides are displayed in a predetermined sequence. Also, the size of the image on the viewing screen can be varied. In a manual mode of operation, a foot switch is available for sequencing the slides and both forward and reverse directions of display are available.

15 Claims, 2 Drawing Sheets

DISPLAY APPARATUS FOR VISUALLY IMPAIRED PERSONS

This application is a continuation-in-part of U.S. patent application Ser. No. 06/938,153 filed Dec. 4, 1986, and now abandoned.

BACKGROUND OF THE INVENTION

The present invention concerns an apparatus for visually displaying information and, in particular, an apparatus for displaying information in magnified form in a predetermined timed sequence to assist persons having vision deficiencies.

Devices for magnifying visual information are very useful in numerous circumstances. One use for such a device is for visually impaired persons. Most persons who are legally blind have some amount of usable vision. Such persons cannot easily read and write. Various devices have been provided for assisting those with lower residual vision These devices include large print matter such as books, periodicals, playing cards and musical scores. Also included are high intensity illuminators, broad-tipped marking pens with writing guides, specialized audio tapes, and magnifiers.

Another use is where there is a requirement that a number of people see the same information at the same time. In such a case, the vision impairment is that the person cannot physically be close enough to the material and a magnified visual display is desirable. Another use is when a speaker does not want to appear to be reading material. A magnified display can be placed a distance in front of the speaker which allows the speaker to appear to be looking at the audience at all times.

In certain instances, it is desirable for the printed material to be displayed in a predetermined time sequence. Typical examples are speeches and musical scores. Many prior art devices have been provided, particularly in the area of music. For example, U.S. Pat. No. 2,483,570 discloses a music timing apparatus. An opaque material strip having musical staffs and notes formed thereon is moved past a light source. Each note is indicated with an aperture wherein the light becomes visible through the aperture as the material strip is moved. The movement of the strip is timed in relation to musical time.

U.S. Pat. No. 3,991,648 discloses a music teaching device having two aligned rows of lamp indicators providing a coordinated physical representation of an associated aligned sheet of music. The lamps of the first row of indicators are illuminated consecutively, each lamp remaining lit for the same time period to provide a visual metronome. The lamps of the second row of indicators are illuminated in selected groups coordinated with the metronome lamps and each group remains lit for the time period corresponding to the notes on the sheet of music. The device includes a scanner, which provides trigger impulses producing substained, rather than flashing illumination of individual lamps and groups of lamps; and a switching system, which ties individual lamps of the second row together for simultaneous indication. In addition, an audio metronome provides a choice of sounds for accent purposes and an audio note section provides a choice of pitch for both individual notes and chords.

U.S. Pat. No. 4,097,135 shows an audio-visual apparatus which includes a projection screen having indicia formed thereon representative of a note play marker, means for successively projecting onto the screen adjacent the note play marker a plurality of visual images of a musical composition recorded on a film strip, means for providing a sound recording of the musical composition and control means for relating the projection of visual images with the playing of the sound recording.

U.S. Pat. No. 3,577,824 discloses a music teaching machine which produces small lighted areas on a screen having musical notations in response to depressions of the keys of an associated musical instrument. The lights are color coded and physically positioned to indicate the sets of notes constituting major thirds and minor thirds. A movie picture projector, lens system and a mirror are arranged to project notes, to be played, on the same screen.

U.S. Pat. No. 4,331,062 discloses an apparatus for visually displaying music notes including a front panel with a grand staff printed thereon and individual light indicators for the various notes of a keyboard.

U.S. Pat. No. 3,887,275 discloses an automatic slide music stand having a pair of supporting legs which are spaced apart to allow one or both legs of a musician to be positioned therebetween when the musician is seated. An inclined opaque projection screen is inclined toward the musician for viewing each sheet of a musical score individually on the screen utilizing one sheet of music per slide in a slide projector mounted behind the screen. On-off, brightness, and projection time controls are provided.

Musical training for low vision individuals traditionally has been largely accomplished without the use of the standard musical score. If printed material were utilized, significant enlargements were then required. Often these enlargements were created by hand or expensive photo-enlarging copying machines with a quality that was less than satisfactory. Although large print music is sufficient for those individuals with slight amounts of vision loss, there are many individuals who cannot benefit by simply doubling or trebling the size of standard music.

Alternative methods of instruction often have resulted in differing the process of musical instruction, which generally meant the discontinuation of the use of printed music altogether. This form of instruction is quite often less than satisfactory, depending on the qualifications of the teacher, and the abilities and memory of the student. Other considerations reducing the effectiveness of teaching without the benefit of music are psychology related, since those who are visually impaired, more often than not, thrive on the opportunity for full participation. Methods of instruction for which a musical score could not be utilized often included rhythm dictations, studies in musical form, training in styles of accompaniment, and so called "playing by ear". Instructional techniques such as these are, indeed, fundamental, however they are not designed for the majority of students with low vision, since most learners progress more naturally in their studies aided by the use of printed music.

Optical aids which are intended to aid persons who suffer from vision loss include the magnifying glass, the monocle and spectacles. However such lenses are generally limited to magnifications of twelve or less.

Optical aids providing greater magnifications include the free-standing magnifier, which can be situated between the music stand or piano and the user. If additional magnification is required, a hand magnifier can be used in conjunction with a stand magnifier. However, stand magnifiers can only be helpful for a limited group of individuals with vision loss, since only limited powers of magnification can be achieved.

Another problem associated with any purely optical aid is that of maintaining correct focal distance. Any movement by the user which alters this focal distance will tremendously effect the clarity of the image. Among other considerations are the limited scope of visual field provided by most magnifying lenses and the requirements of adequate, glare-free illumination.

Other modern developments encompass a variety of electronic magnifiers and illuminators such as a closed circuit television monitor, often coupled with a large display computer processor, allowing for tremendous flexibility in the projected information, as well as providing magnification many times that of large print, commonly sixty times or more. Systems of this type are extremely beneficial to those with vision loss; however, due to restraints in terms of costs, ease of operation, availability of programming materials, physical size, as well as other considerations, such devices are unfortunately seldom practical.

Other problems associated with vision impairment are contrast and color. Light is a component of the electromagnetic spectrum and the visible region for an assumed standard observer at normal levels of illumination extends from about 4300 Angstroms to about 6900 Angstroms in wavelength. One Angstrom is $10^{-10}$ meter. Since the eye sensitivity curve approaches the wavelength axis asymptotically at both the violet (short wavelength) and red (long wavelength) ends, the limits of the visible region are usually defined at 1% of the maximum sensitivity value. The maximum value occurs in the center of the visible region at about 5550A producing a sensation of yellow-green. Typically, printed music is black on a white background and, when projected on a viewing screen, provides excellent contrast. However, where the viewer has reduced sensitivity, contrast can be increased by providing a color for the background and/or the musical notation. For example, the eye is more sensitive to blue than to green and more sensitive to green than to red.

SUMMARY OF THE INVENTION

The primary purpose of the present invention is to aid those with low or impaired vision to read music and other material. The notation is made available to the low vision user by illuminating and magnifying its original size to a degree that an individual with substantial vision loss is enabled to utilize standard musical scores. Reading, as noted above, is a primary difficulty for those with reduced vision. The requirements of any device to assist the low vision user to read must include the following: sufficient enlargement, together with adequate brightness, contrast, and clarity of the image.

The present invention provides for the above requirements. Furthermore, the invention furnishes the visually impaired musician with flexibility, ease of operation, large screen size, magnifications approaching one hundred, constant focus, adjustable brightness, automatic or manual operation, relative low cost, as well as other conveniences including portability and a wide range of other uses.

The present invention concerns a display apparatus adapted to be positioned on an upper surface of a piece of furniture. The apparatus has a viewing screen for the rear projection of information which can be stored, for example, on slides and projected on the screen in a predetermined timed sequence. In an automatic mode of operation, a tempo control can be utilized to vary the speed at which the individual slides are presented. A brightness control can be utilized to select the desired degree of brightness for the image on the screen. An image size control can be utilized to vary the degree of magnification of the projected image. In a manual mode of operation, the sequence of display can be reversed and a foot switch can be utilized to control the display of one slide at a time. The background and/or the information to be displayed can be provided with color.

BRIEF DESCRIPTION OF THE DRAWINGS

The above, as well as other objects of the invention will become readily apparent to one skilled in the art from reading the following detailed description of the preferred embodiment of the invention when considered in the light of the accompanying drawings in which.

DESCRIPTION OF THE PREFERRED EMBODIMENT

Figure 3:
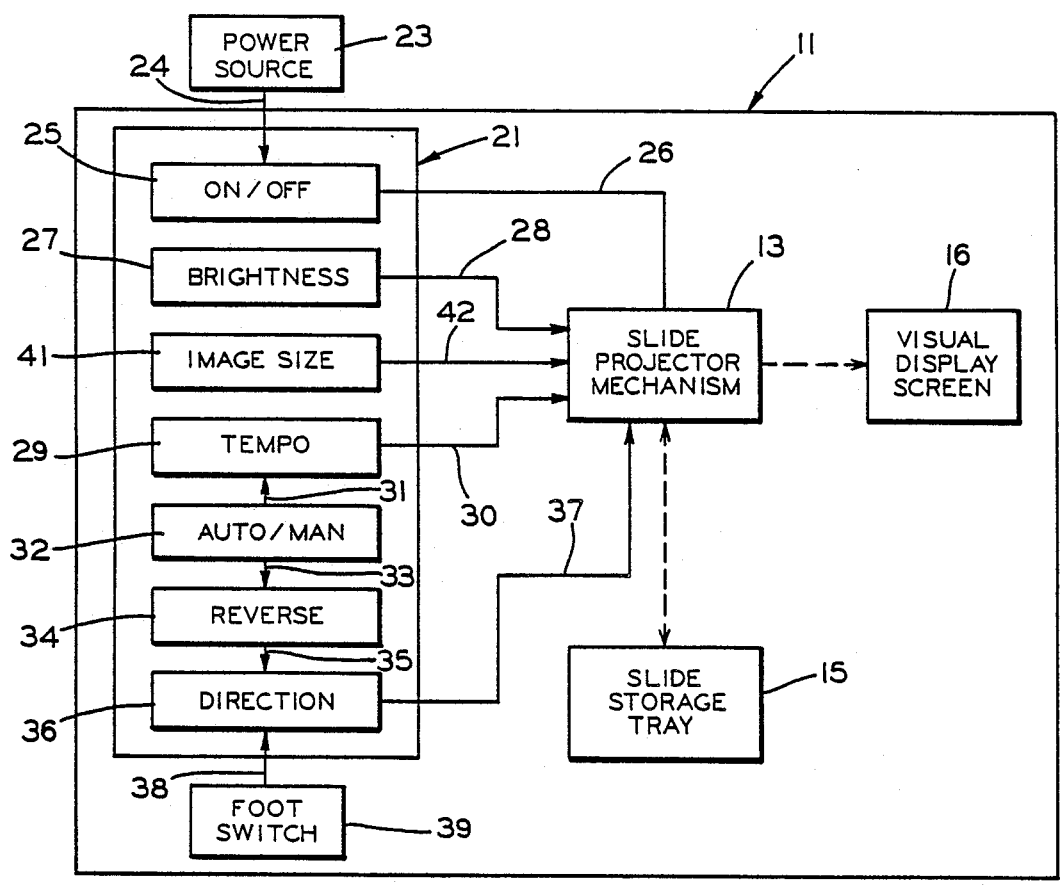
FIG. 3 is a block diagram of the present invention.

A visual display apparatus 11 according to the present invention is shown in the drawings. An enclosure or housing 12 houses a conventional slide projector mechanism 13 (FIG. 3). The housing 12 has a stepped upper surface with an upper rear surface portion 14 supporting a conventional slide tray 15. The slide tray 15 is mechanically coupled to the slide projector mechanism 13 for storing and supplying individual slides to be displayed. The slide tray 15 is representative of any conventional slide storage mechanism. A rear projection screen 16 is positioned on a front vertical surface of the enclosure 12 for displaying the images carried by the slides to be viewed by a person.

Figure 1:
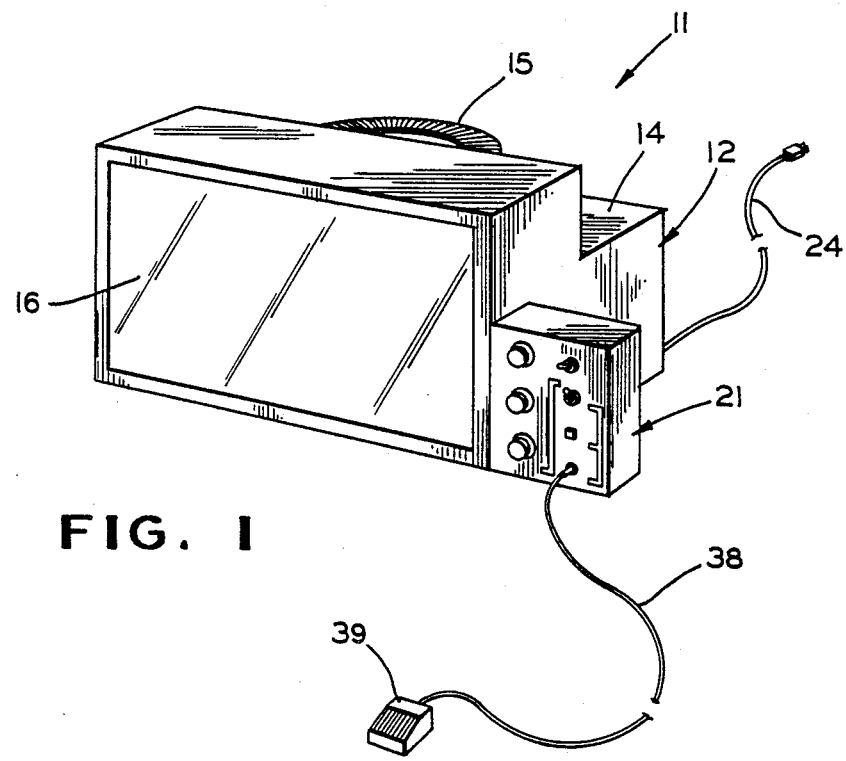
FIG. 1 is a perspective view of a display apparatus according to the present invention.
Figure 2:
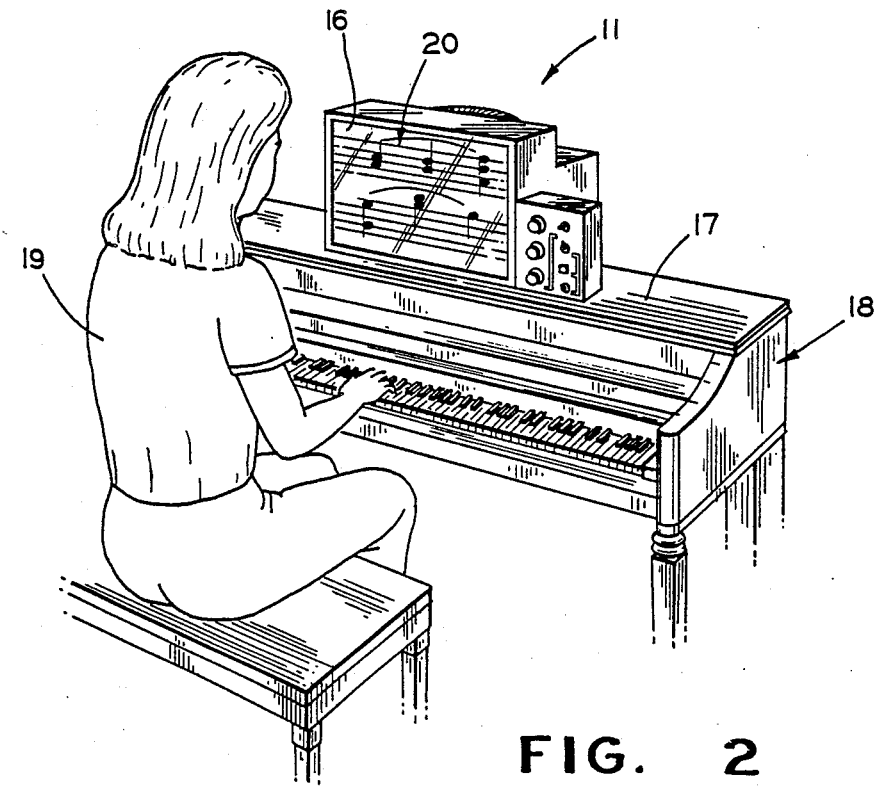
FIG. 2 is a perspective view of the present invention being utilized to display music in association with the playing of a piano.

For example, as shown in FIG. 2, the display apparatus 11 is adapted to be positioned on an upper surface of a piece of furniture and can be positioned on a top surface 17 of a piano 18. The display apparatus 11 is positioned such that the screen 16 is within the field of vision of a person 19 seated at the piano 18 in order to display a measure of music 20. Also, the surface portion 14 can be eliminated and the slide tray 15 positioned inside an enlarged control box 21.

Figure 4:
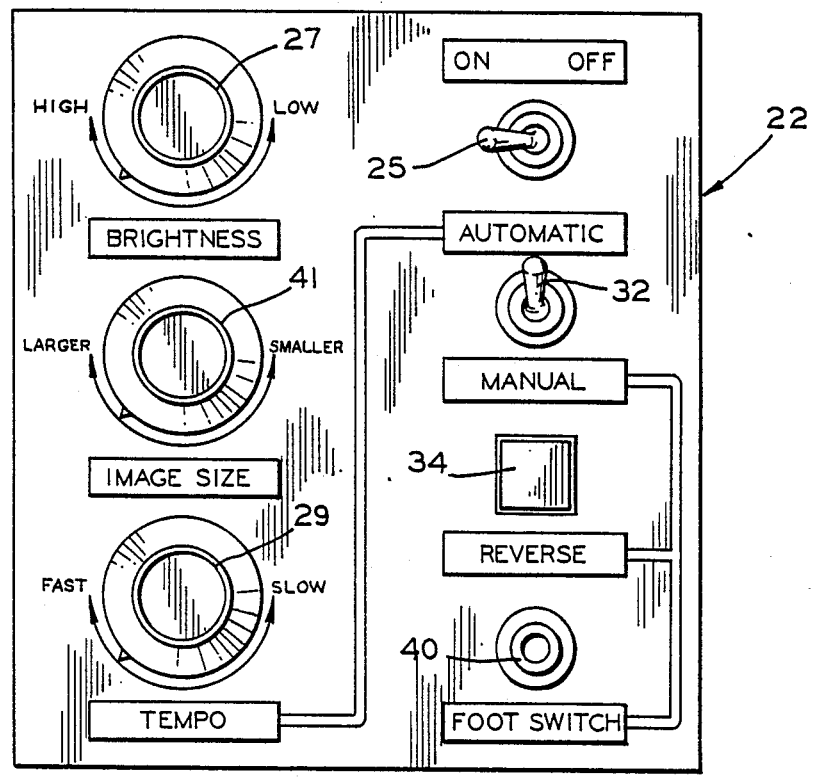
FIG. 4 is an enlarged elevational view of the control panel of the display apparatus of FIG. 1.

Attached to one side of the enclosure 12 is the control box 21. All of the operations of the display apparatus 11 are controlled through the control box 21 which includes a switch panel 22 shown in more detail in FIG. 4. Referring to FIGS. 3 and 4, the display apparatus 11 receives electrical power from a conventional power source 23 such as a standard wall outlet. Power from the power source 23 enters a power supply line 24 which is connected to an on/off switch 25 on the switch panel 22. The switch 25 is connected in series between the power line cord 24 and an internal power line 26 which is connected to the slide projector mechanism 13. When the switch 25 is in the "on" position, electrical power is provided for operating the mechanism 13. The slide projector mechanism 13 obtains a slide from the tray 15, lights a projection lamp (not shown) to display the image from the slide on the visual display screen 16, and returns the slide to the tray 15.

A brightness control 27 is provided for adjusting the intensity of the projection lamp. The control 27 is shown as a rotary switch which could be a potentiometer connected to the slide projector mechanism 13 by a line 28 for varying the amount of electrical power provided to the projection lamp. A tempo control 29 is also provided. The control 29 is also shown as a rotary switch which could be a potentiometer connected by a line 30 to the slide projector mechanism 13 for controlling the speed at which the slides are changed in order to coordinate the visual display with the speed at which the music is to be played. The tempo control 29 is connected by a line 31 to an automatic/manual switch 32. The switch 32 enables the tempo control 29 in the "automatic" position and disables the tempo control 29 in the "manual" position.

The automatic/manual switch 32 is connected by a line 33 to a reverse switch 34. The reverse switch 34 is connected by a line 35 to a direction control 36. The direction control 36 is connected by a line 37 to the slide projector mechanism 13. A line 38 can have a jack (not shown) attached to one end and a foot switch 39 attached to an opposite end. The jack cooperates with a plug 40 on the switch panel 22. When the switch 32 is in the "manual" position, the slide projector mechanism 13 is controlled by the foot switch 39. Each actuation of the foot switch 39 will cause the replacement of a slide currently being shown with a new slide selected from the storage tray 15. Thus, the operator can control the speed at which the slides are displayed simply by pressing the foot switch 39. The reverse switch 34 is utilized to reverse the direction of rotation of the slide storage tray 15. When the reverse switch 34 is in the "reverse" position, each actuation of the foot switch 39 will rotate the slide storage tray 15 in a rearward rather than a forward direction thereby allowing for a review of previous measures in the musical selection being displayed. In the alternative, the reverse switch 34 can function to reverse rotate the slide tray 15 one position with each actuation. The reverse switch 34 and the foot switch 39 are only operable when the switch 32 is in the "manual" position.

The tempo control 29 permits the selection of tempo within a normal range for most music such as from two to six seconds duration per measure. Of course, the manual mode of operation is desirable when the student is first learning a piece of music and the automatic mode of operation is more desirable once the student is more proficient. The screen 16 can be of any convenient size, but a screen fourteen and one half inches in height and eighteen inches in width has been found to be desirable for displaying a single measure of music with the distance relationship shown in FIG. 2. A full size image on such a screen is approximately ninety-six times (width times height) the size of a standard measure of music. A standard measure of music printed on an 8.5" by 11" page has a height of approximately 1.25" to 1.50" and a width of approximately 1.75" to 2.00". Since a conventional rectangular slide has an image size of approximately 0.92" high by 1.34" wide, the original image must be photographically reduced in size to be stored as an image of information on the slide. If, for example, the projection screen is approximately 14.5" by 18" wide, the increase in size of the original image will be substantial and in a range of eighty-seven to one hundred nineteen times the product of the height times the width. The slide projector mechanism 13 could include two similar mechanisms which alternately select slides for display thereby permitting a fading in and out effect to be achieved.

The external positioning of the slide tray 15 allows for easy placement and exchange by the user. The capacity of a standard slide tray is eighty slides, or measures of music, which is roughly the number of measures found in a typical three to four page piece of music. The slides should be prepared utilizing a high quality camera and high-resolution film in order to reproduce the extremely small markings that are frequently found within most musical scores. The slides can be prepared with a colored background and/or colored information. The slides are marked to indicate the sequence of display for ease of loading into the tray and storage. In the automatic mode of operation, the present invention is well suited for use by handicapped persons with gross motor deficiencies, arthritis and amputations. Although well suited for the display of musical information, the present invention can be utilized to display any type of information in timed sequence. For example, math drills, reading drills, spelling drills and memory development materials.

In some instances, the distance between the viewer and the screen 16 is such that less or more than a standard magnification is required. An image size control 41 is provided and operates in a manner similar to the controls 27 and 29. The control 41 is connected to the mechanism 13 by a line 42 to provide larger and smaller images by moving the projector less with respect to the screen while maintaining focus on the screen 16.

The present invention can be utilized to perform a method of displaying images of information to persons having vision deficiencies. A transparency of each of a plurality of images of information is prepared and placed into a storage means such as a slide tray. The transparency is prepared by photographically reducing the size of the original image. A rate for displaying the transparencies is selected from a range of available rates or tempos. The transparencies are moved in a predetermined sequence from the storage means to a projection means. The projection means is operated to visually display the images in the predetermined sequence. Also, the brightness of the visual display can be varied by selecting a desired brightness from a range of brightnesses and the size of the image on the screen can be varied. In a manual mode of operation, one of two predetermined sequences of display can be chosen namely, forward and reverse.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for visually displaying stored information to persons having vision deficiencies comprising:
   a housing adapted to be positioned on an upper surface of a piece of furniture and having a stepped upper surface with a rear portion lower than a front portion;

a rear projection viewing screen mounted on a surface of said housing and oriented to be viewed by a person located adjacent the piece of furniture;

means mounted to said rear portion of said housing for individually storing a plurality of images of information each said image photographically reduced in size from an associated original size image having a height and a width;

means for selecting a predetermined one of said stored images from said means for storing and projecting said selected image on said viewing screen as a projected image increased in size wherein the product of the height and width of said projected image is in a range of approximately eighty-seven to one hundred nineteen times the product of a height times a width of said associated original image as a whole;

means mounted to said housing for selectively varying the brightness of said selected image on said viewing screen; and means mounted to said housing for selectively varying the length of time said selected image is projected on said viewing screen whereby a person having a vision deficiency is enabled to recognize said projected image.

2. The apparatus according to claim 1 wherein said means for storing is a slide tray releasably mounted on said rear portion.

3. The apparatus according to claim 1 wherein said means for storing has means for retaining said images of information in a predetermined order.

4. The apparatus according to claim 3 wherein said means for storing is a rotary slide tray.

5. The apparatus according to claim 1 wherein said means for selecting and projecting includes a projection lamp and means for maintaining said selected image between said projection lamp and said viewing screen.

6. The apparatus according to claim 5 wherein said means for selectively varying the brightness includes means for controlling the amount of electrical power available to said projection lamp.

7. The apparatus according to claim 1 wherein said means for selecting and projecting includes lens means positioned between said viewing screen and said selected image.

8. The apparatus according to claim 1 wherein said means for selectively varying the length of time includes means for varying the speed at which said means for selecting and projecting selects successive ones of said stored images.

9. The apparatus according to claim 1 including a control means connected to said means for selecting and projecting and having a first switch means for selecting an automatic mode of operation whereby said stored images are selected and displayed on said viewing screen in a predetermined sequence.

10. The apparatus according to claim 1 including a control means connected to said means for selecting and projecting and having a first switch means for selecting a manual mode of operation whereby said stored images are selected and displayed on said viewing screen in a predetermined sequence each in response to the actuation of a second switch means.

11. The apparatus according to claim 10 wherein said second switch means is a foot actuated switch.

12. The apparatus according to claim 10 including a direction control means connected to said first and second switch means and to said means for selecting and projecting and a third switch means connected to said direction control means for selecting between two predetermined sequences for displaying said stored images.

13. The apparatus according to claim 1 including means for selectively varying the size of said selected image on said viewing screen connected to said means for selecting and projecting.

14. The apparatus according to claim 1 wherein at least one of said stored images includes information on a colored background.

15. The apparatus according to claim 1 wherein at least one of said stored images includes colored information.

* * * * *